Dec. 19, 1967  J. H. MABERRY  3,358,385
RECIPROCATING GRATE CONVEYOR WITH SIDE
WALL DAMAGE PREVENTING MEANS

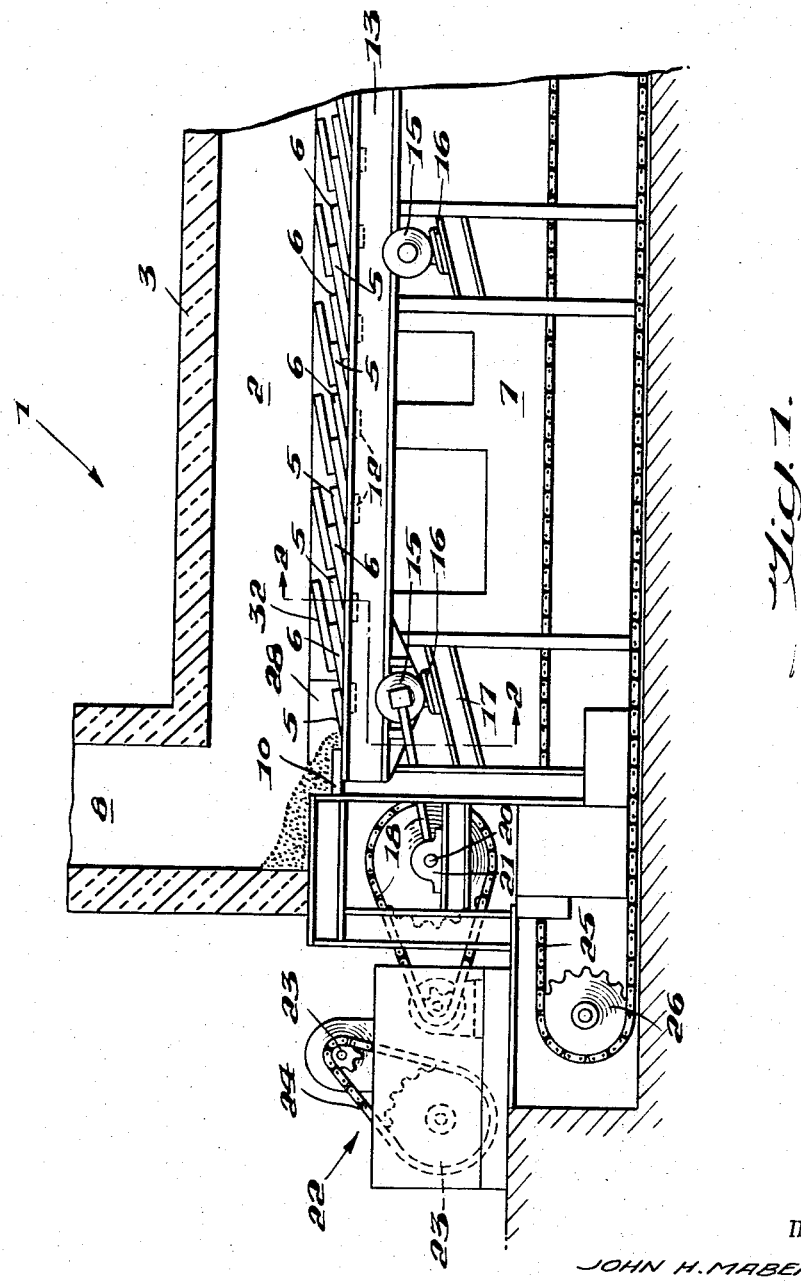

Filed April 12, 1965  2 Sheets-Sheet 2

INVENTOR
JOHN H. MABERRY,

BY Pennie Edmonds Morton
Taylor and Adams
ATTORNEYS 3,358,385
RECIPROCATING GRATE CONVEYOR WITH SIDE
WALL DAMAGE PREVENTING MEANS
John H. Maberry, Macungie, Pa., assignor to Fuller
Company, a corporation of Delaware
Filed Apr. 12, 1965, Ser. No. 447,197
5 Claims. (Cl. 34—164)

This invention relates to a horizontal heat-exchange apparatus and more particularly to an apparatus very similar to that disclosed in the United States Patent No. 2,846,778.

The apparatus of this invention differs from United States Patent No. 2,846,778 in various features and is an improvement upon that patent.

The apparatus of the above patent comprises a heat exchanger having a series of fixed and movable grates arranged in a horizontal and overlapping fashion. The grates are so positioned that each alternate grate reciprocates longitudinally with respect to each fixed grate.

Extending within the firebrick casing of the heat exchanger along its entire length, and abutting up against the inside surface of the casing, are two rows of elongated vertical metal wear plates. The wear plates are positioned immediately adjacent the outer edges of the grates, and serve as insulation to protect the firebrick casing from abrasion and damage when the hot material flows over the grates.

In the operation of this heat exchanger, hot clinker material, which is to be subjected to cooling, moves along the grates by the reciprocating motion of the alternate grates while cool air passes up through perforations in all the grates to cool the material.

In such a heat exchanger, the movable grates, during forward motion, force the hot material along the surface of the stationary grates and over the noses of the stationary grates. The material thus falls onto the next adjacent moving grate. On retraction of the movable grates, their overlying stationary grates act as pushers over the moving grates. In this manner, hot material is progressively moved while being subjected to the cooling effect of the air passing through the grates.

Horizontal heat exchangers of this type have effectively cooled material but, at the same time, have been subject to certain disadvantages.

The metal plates which are aligned up against the firebrick wall of the casing on each side of the grate assembly provide a metal insulation surface against which the hot material continually abrades.

This hot-material to metal-plate contact acts to raise the temperature of the plates, making the metal more subject to abrasive wear, and requiring periodic replacement of the wear plates.

Further, since each one of the insulating metal plates carries a supporting flange near its lower horizontal edge, the edge grates themselves are difficult to remove once they are damaged or become worn.

Still further, if the insulating plates are to abut up against the interior of the firebrick casing, it becomes necessary to use care to accurately align each section of the plates directly lengthwise of each other along the entire length of the heat exchanger. This is necessary, since the edges of the plates might protrude into the flow path of the hot material. If this would occur, the entire edges of the metal plates would be worn away by their constant contact with the flowing hot material. This would, of course, necessitate the replacement of the worn plates since, otherwise, the firebrick casing would not be completely protected from damage by the hot material.

This invention relates to a horizontal heat exchanger which avoids these above-mentioned disadvantages, and thereby makes it possible to cool incoming material efficiently, without any undue damage or wear to the firebrick insulation.

More particularly, this invention contemplates a horizontal heat exchanger comprising an assembly of perforated, alternately positioned, stationary and movable grates arranged in an overlapping series and including upwardly-extending box members positioned along the edge of the grate assembly and spaced away from the sides of the firebrick casing between said casing sides and said grates. Each box member is so positioned that it is adapted to contain and confine a quantity of the same material that is to be cooled in such a way as to support a body of material to form a junction surface, or a flexible material wall, over which new incoming material contacts as it progressively moves along within the heat exchanger.

For a better and more complete understanding of the invention, reference is made to the following drawings, in which:

FIG. 1 is a partial vertical cross-sectional view of one end of the invention;

Figure 3:
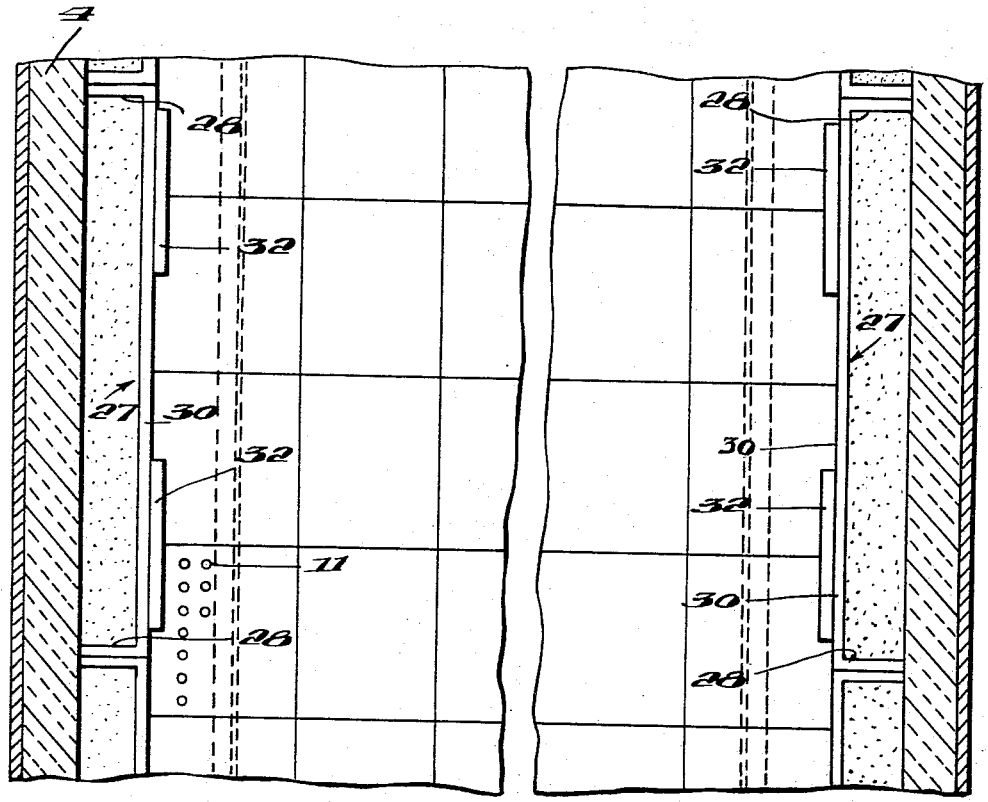
FIG. 3 is a partial top plane view of the invention.
Figure 2:
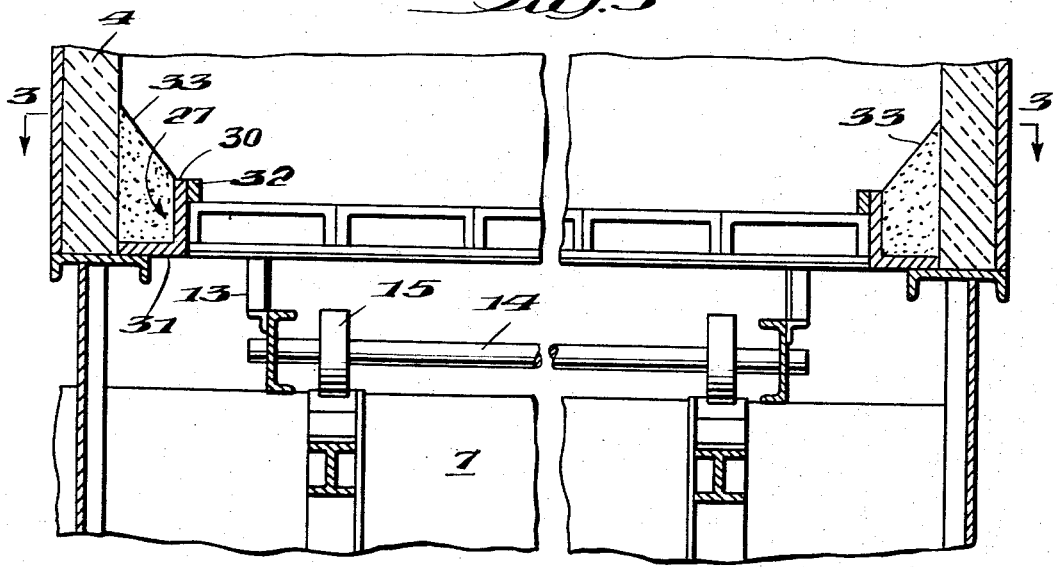
FIG. 2 is a vertical cross-sectional view of the invention, taken along line 2—2 of FIG. 1.

The horizontal cooler generally indicated by 1 comprises a cooling chamber 2 formed by a top casing 3 and side casings 4. A plurality of alternate fixed and movable cooling grate rows 5 and 6, respectively, define a grate assembly or floor of the cooling chamber 2. Both the top and side casings include firebrick to provide a suitable insulation. A plenum chamber 7 is arranged directly below the grate assembly.

The cooler chamber has a material inlet 8 located at one end and a material outlet (not shown) located at the opposite end therefrom. Directly beneath the material inlet 8 is a material-receiving shelf 10 onto which hot clinker drops after it passes into the material inlet.

The grate assembly is shown arranged horizontally throughout the entire length of the cooling chamber 2. Each grate is slightly inclined and overlaps the next adjacent grate in the direction away from the material inlet 8. However, it is to be understood that the grate assembly may be inclined from the horizontal, while the grates are generally horizontal and are so reciprocated.

The individual grates of each grate section are provided with perforations 11 for passage of cooling air from the plenum chamber 7 upwardly into the overlying material.

Each movable grate section 6 is carried on a support 12 attached to a movable frame 13. The frame 13 is horizontally arranged along the length of the cooling chamber 2 within the plenum chamber 7 of the apparatus.

The frame 13 carries two or more horizontal shafts 14, each of which, in turn, supports a pair of rollers 15 mounted to roll on one of several inclined tracks 16 supported by a stationary frame 17 located within the plenum chamber 7.

One pair of rollers 15 is engaged by a cam arm 18, which is connected to an eccentric shaft 20 mounted in bearings 21. The eccentric shaft 20 is driven by means of the variable speed driving unit 22 through gears 23 and chain 24.

Any fines from the bed of material being cooled which may pass through the perforations 11 in the grates and into the plenum chamber 7 fall onto a drag chain conveyor 25 and are carried away for removal. The drag chain 25 passes over pulley 26 and is mechanically engaged by a drive gear assembly (not shown).

Air under suitable pressure is introduced into the plenum chamber 7 for passage upwardly through the grate perforations 11 and into the cooling chamber 2.

Positioned along the entire length of the cooling chamber 2 are a plurality of upwardly-extending metal box members, generally indicated by 27. These box members are positioned between the side casing 4 and the series of perforated grate sections 5 and 6. The box members include vertical portions 28 which extend inwardly from the firebrick casing 4, a vertical end portion 30 which joins the side portions, and a bottom portion 31.

There is positioned on the inside surface of each box member 27, and inclined upwardly in the same direction as the inclined grates, at least one guide 32 for each movable grate section 6. These guides are arranged so that the movable grate sections 6 slide directly above the upper surface of the stationary grate sections 5 in order to force the hot material over the nose of the stationary grate sections 5.

The box members 27 form a series of rectangular bins arranged contiguously along the interior wall of the cooling chamber 2 immediately adjacent the side edge of the grate assembly, and thus are adapted to contain and confine a desired amount of material along the wall of the side casing 4.

Both the width and depth of the box members are not critical. However, the width and depth are sized according to the working bed depth required and the characteristic angle of repose of the material. This may be, for example, approximately 35°.

In operation, the box members 27 are first filled with previously cooled clinker material until a flexible material wall 33 of cold clinker is formed, which is inclined downwardly in a direction inward from the casing sides 4 of the apparatus. See FIG. 3.

The drive unit 22 is energized, whereby the alternate-movable grate sections 6 are set in reciprocating motion.

Hot material is then introduced into the material inlet 8 and it falls by gravity onto the shelf 10 and the grate sections immediately adjacent thereto.

The material, introduced into the cooling chamber and accumulating at the inlet end of the cooling chamber 2, is thus moved by the movable grates 6 through the entire apparatus.

Since the material within and supported over each box member 27 is held in a relatively stationary condition by the side casing 4 and the side, bottom and end portions of the box member, it remains in a relatively static condition as the hot material advances along the grate sections.

As the amount of material being introduced into the material inlet is increased, the level of material passing through the cooling chamber 2 will rise until a portion of this material contacts the flexible material wall 33 of the cool material held by the box members 27. Accordingly, there is formed along the material wall 33 a junction surface or interface, defined by hot material on the one side and cool material on the other side.

While it is true that the constant moving action of the hot material in contact with the cool material wall will drag a portion of the cool static material along with it, the material wall of the generally static mass of material is self-replaceable, since the small amount removed will always be replaced by other incoming material.

Since the material held by the box members 27 is relatively static with respect to the moving action of the hot incoming material, the static material is continually subjected to the cooling action of the upwardly flowing air from the plenum chamber 7. Accordingly, the confined material is considerably cooler than the material passing over the grate sections 5 and 6. Therefore, this junction surface not only acts to cool the hot material immediately adjacent, but acts to prevent the hot material from contacting and damaging the firebrick casing 4 of the apparatus.

While this invention has been particularly described in connection with a cooler for cooling hot cement clinker, it is to be understood that such description is merely by way of exemplification, and the invention is applicable to heat exchanging of any material in the form of discrete particles; also that various changes may be made in the details of construction of the apparatus, without departing from the invention or sacrificing any of the advantages thereof.

I claim:
1. In a heat-exchange apparatus comprising a longitudinal, substantially horizontally-disposed chamber, having an insulated casing disposed therein, an entrance for material at one end of said casing and a discharge port for material at the other end, a means for transporting said material from said entrance to said discharge port, said transporting means extending longitudinally of the chamber adjacent said sides of said casing, the improvement comprising means positioned between the sides of said casing and said transporting means for confining and interrupting a transportation of a predetermined quantity of said material to form a flexible material wall therebetween, said confined material serving as an insulating means to protect the casing against damage from the transported material.

2. In the apparatus of claim 1 wherein said material wall assumes its natural angle of repose extending away from said casing.

3. In the apparatus of claim 1 wherein said confining means comprises an elongated upwardly opening bin positioned adjacent each side of said casing and coextensive therewith.

4. In the apparatus of claim 3 wherein said bin comprises a bottom wall, a pair of end walls extending from said casing which forms a first wall of said bin, and a second wall communicating with said end walls.

5. In the apparatus of claim 1 wherein said transporting means includes a series of grates.

References Cited

UNITED STATES PATENTS

| | | | |
|---|---|---|---|
| 1,374,874 | 4/1921 | Bassler | 34—242 X |
| 1,375,080 | 4/1921 | Chappell | 34—242 X |
| 2,846,778 | 8/1958 | Markle | 34—164 |

KENNETH W. SPRAGUE, *Primary Examiner.*

DONLEY J. STOCKING, *Examiner.*

A. D. HERRMANN, *Assistant Examiner.*